United States Patent [19]

Kodaira et al.

[11] Patent Number: 4,835,734

[45] Date of Patent: May 30, 1989

[54] ADDRESS TRANSLATION APPARATUS

[75] Inventors: Mitsuhiko Kodaira, Yokohama; Tokio Shiraga, Ebina, both of Japan

[73] Assignee: Hitachi, Ltd., Tokyo, Japan

[21] Appl. No.: 36,472

[22] Filed: Apr. 9, 1987

[30] Foreign Application Priority Data

Apr. 9, 1986 [JP] Japan ............................... 79922

[51] Int. Cl.$^4$ .............................................. G06F 9/00
[52] U.S. Cl. .................................... 364/900; 364/955; 364/955 S
[58] Field of Search ... 364/200 MS File, 900 MS File

[56]  References Cited

U.S. PATENT DOCUMENTS 4,285,040  8/1981  Carlson et al. .................... 364/200
4,355,355 10/1982  Butwell et al. .................... 364/200

FOREIGN PATENT DOCUMENTS 56-140576 11/1981  Japan .
58-189892 11/1983  Japan .

OTHER PUBLICATIONS

"Principles of Operation IBM 370"-IBM Corp.

Primary Examiner—Gareth D. Shaw
Assistant Examiner—John G. Mills
Attorney, Agent, or Firm—Antonelli, Terry & Wands

[57] ABSTRACT

A virtual space is divided into a plurality of areas of different memory block size, and a plurality of address translation modes are executed using different memory block sizes and based upon a virtual memory address. By dividing a part of the virtual memory space into finer memory blocks, the efficiency of use of the memory space is improved, and existing programs can be easily applied. Selecting one of a plurality of address translation modes is performed using such means as part of a virtual address, and/or a flag.

19 Claims, 5 Drawing Sheets

ADDRESS TRANSLATION APPARATUS

BACKGROUND OF THE INVENTION

1. Field of the Invention

The present invention relates to a computer system using a virtual memory space, and more particularly to address translation of a virtual memory system.

2. Description of the Related Art

In a computer system using a virtual memory space, a user specifies an address of a memory using a virtual address of a virtual memory space. To access a real memory device such as a main storage, it is necessary to translate the virtual address into the real address of a real memory space. The term "real memory space" used throughout this specification includes those which can be considered as a real memory space on an operating system, e.g., a logical address space on a virtual machine.

Address translation is performed using a translation table indicating the relationship between virtual addresses and real addresses. Generally, a memory space is first divided into segments, and each segment is divided further into pages. Address translation is performed in accordance with a segment-page arrangement, using a segment table and a page table. Address translation is usually made simple by using the same lower bits both for the virtual and the real addresses.

Each entry of a segment table specifies an address of a page table, and each page table defines a plurality of pages within the specified address space. An entry of a page table can specify an address of a page frame allocated in a main storage. The size of a segment or a page is determined considering effective use of real storage, efficiency of block transfer between an auxiliary storage and a main storage, and the like. In view of the fact that factors to be considered become different depending upon the respective computer system, there is known a system in which the size of a segment is changed for each virtual address space by means of an address translation control register.

In a system having a large memory capacity (2 giga bytes) whose virtual addresses are represented by 31 bits, the size of the address area associated with an address translation table becomes large. Here, the term "giga byte" represents 1024 mega bytes in strict meaning. Similarly, "kilo bytes" represents 1024 bytes and "mega byte" represents 1024 kilo bytes. If a segment having 64 kilo bytes is employed so as to use a memory in finer units, the number of entries of the segment table becomes 32,768. If a segment having one mega byte is employed so as to make the size of the segment table small, the memory must be used in units of one mega byte although the number of entries is reduced to 2048. For instance, when 3.1 mega bytes are to be used, a memory space of 4 mega bytes must be occupied. JP-A-58-189892 has proposed that the system common portion and the user dedicated portion are freely allocated on an address space in units of segments. However, the loss of virtual memory size at a segment division point has not been considered.

SUMMARY OF THE INVENTION

It is an object of the present invention to provide an address translation apparatus providing efficient use of memory.

It is another object of the present invention to provide an address translation apparatus wherein the size of the memory block in address translation is made variable in a virtual memory space.

According to one aspect of the present invention, when a virtual address is translated into a real address, an address translation mode is determined and an address translation is executed in accordance with the translation mode. For example, both 1 mega byte segments and 64 kilo byte segments exist in a virtual memory space such that the 64 kilo byte segments are used when the upper 7 bits of a virtual address are all 0 and otherwise the 1 mega byte segments are used. Since two sizes of segments exist in a virtual memory space, it is possible to use a real memory space as necessary without making the size of a segment table too large, thus improving the efficiency of using the real memory space.

In case a conventional virtual address system using 24 bit notation is to be changed to a virtual address system using 31 bit notation, it is desirable to enable use of already developed programs using virtual addresses of 24 bit notation. In this case, 16 mega bytes within a memory space of 2 giga bytes are frequently used. Also, since the area lower than 16 MB is only 1/128 of the entire space (2 giga bytes), memory allocation in this area must be carried out with consideration of efficient use of the memory. With a conventional scheme where only one type of address translation can be appointed for one virtual address space, the area lower than 16 MB cannot be used efficiently if a suitable address translation table size is used for the are higher than 16 MB. This problem, however, can be solved by dividing a virtual memory space into a plurality of areas, and giving a different segment size for each divided area. Even if a user program is executed using divided areas, the user program correctly operates without giving any influence on the processing.

DESCRIPTION OF THE PREFERRED EMBODIMENTS

Figure 1:
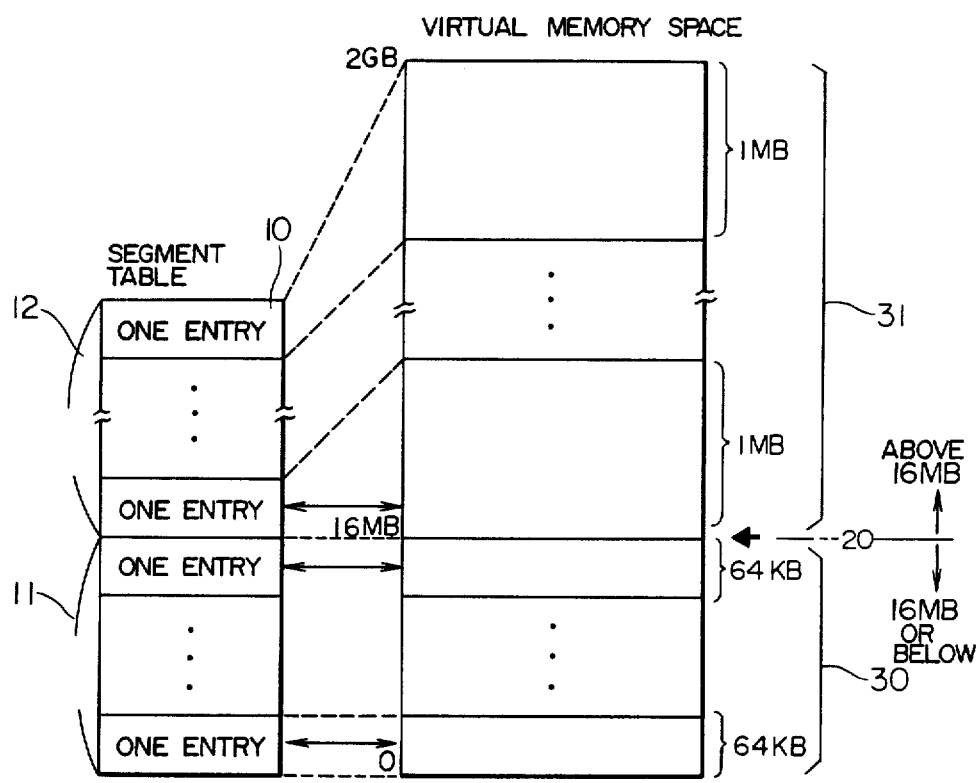
FIG. 1 is a schematic drawing for explaining the principle according to an embodiment of the present invention.
Figure 2:
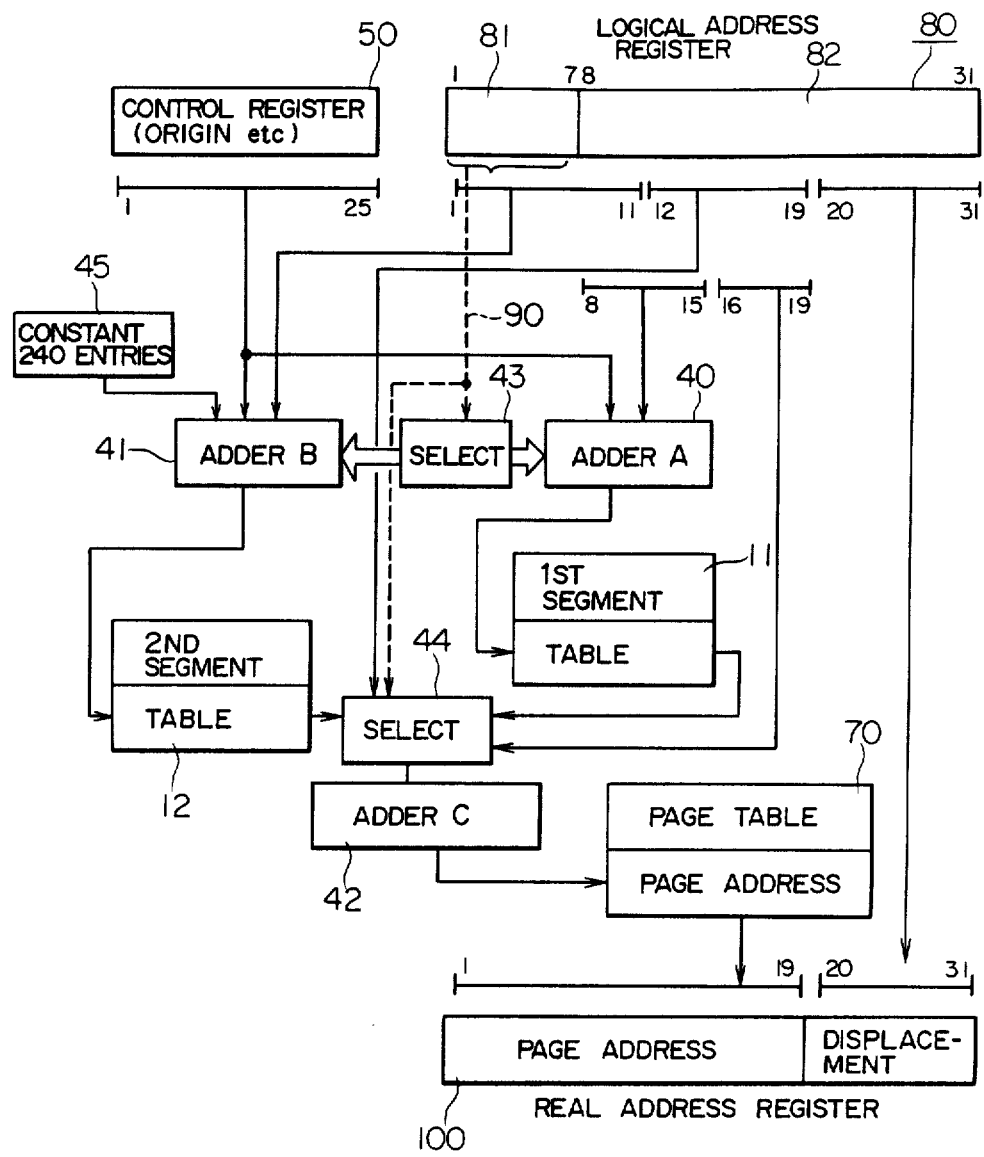
FIG. 2 is a block diagram showing an address translation apparatus embodying the principle shown in FIG. 1.

FIG. 1 illustrates the concept of an address translation method, and FIG. 2 shows an example of the circuit arrangement implementing the address translation method shown in FIG. 1. Referring to FIG. 1, a virtual memory space has a capacity of 2 giga bytes and is addressed by a virtual address constructed of 31 bits. The virtual memory space is divided at a division point 20 into an area 30, equal to or lower than 16 MB, and an area 31, in excess of 16 MB. The area 30, equal to or lower than 16 MB, is divided into 256 segments having 64 kilo bytes/segment. A corresponding segment table 11 then has 256 entries. The area 31, in excess of 16 MB, is divided into 2032 segments having one mega byte/segment. A corresponding segment table 12 then has 2032 entries. Each page in the respective areas has four kilo bytes. Thus, the overall segment table 10 has 2032+256=2288 entries. This entry number is considerably smaller than the entry number of 32,768 obtained when the entire area is divided by 64 kilo bytes/segment. As a result, it is possible to keep the segment table size small. In addition, the efficiency of use of the area less than or equal to than 16 MB can be improved because its segment has 64 kilo bytes.

The general principles of virtural memory are disclosed in "Principle of Operation, IBM 370" (IBM) which is hereby incorporated herein by reference.

FIG. 2 shows an address translation apparatus wherein a virtual memory space is divided into two areas at a division point, each having a different segment size.

A logical address of 31 bits specified by a program is set in a logical address register 80 from the bit number 1 to the bit number 31. The logical addresses within the area lower than 16 mega bytes, which can be specified using 24 bits, are designated by the bits from the bit number 8 to the bit number 31, with the remaining upper bits from the bit number 1 to the bit number 7 being all "0". That is, the logical addresses not higher than 16 MB can be detected based on whether the upper 7 bits are all 0 or not.

The 12 bits from the bit number 20 to the bit number 31 indicate a displacement within each four kilo byte page, and the same 12 bits are used in common for both the real and virtual addresses.

Consequently, the bits subjected to address translation are those bits from the bit number 1 to the bit number 19. For a segment constructed of one mega byte, 11 bits from the bit number 1 to the bit number 11 specify a segment. For a segment constructed of 64 kilo bytes, 8 bits from the bit number 8 to the bit number 15 (all 0's for 7 bits from the bit number 1 to the bit number 7) specify a segment.

The control register 50 stores a different address for each virtual space, which address indicates a top address (origin) of a segment table for use in address translation of a virtual space.

First and second segment tables 11 and 12 are provided for processing two types of virtual addresses which are different in segment size. The first segment table 11 is for the area (represented by 30 in FIG. 1) not higher than 16 MB, and specified by 24 bits. The number of each segment containing 64 kilo bytes is obtained by adding the contents of 8 bits from the bit number 8 to the bit number 15 to the origin value by an adder A 40. The first segment table 11 designates a first location of a segment within a real memory space based on the segment number. The second segment table 12 is for the area (represented by 31 in FIG. 1) in excess of 16 MB, and specified by 31 bits. The number of each segment containing one mega byte is obtained by adding the contents of 11 bits from the bit number 1 to the bit number 11 to the origin value. Based upon the segment number, the first location of a segment within the real memory space is designated. Since the area 3, which corresponds to 16 segments each constructed of one mega byte, is divided into 256 semgents, an off-set 256−16=240 in the segment number occurs. A constant register 45 gives this value.

Figure 3:
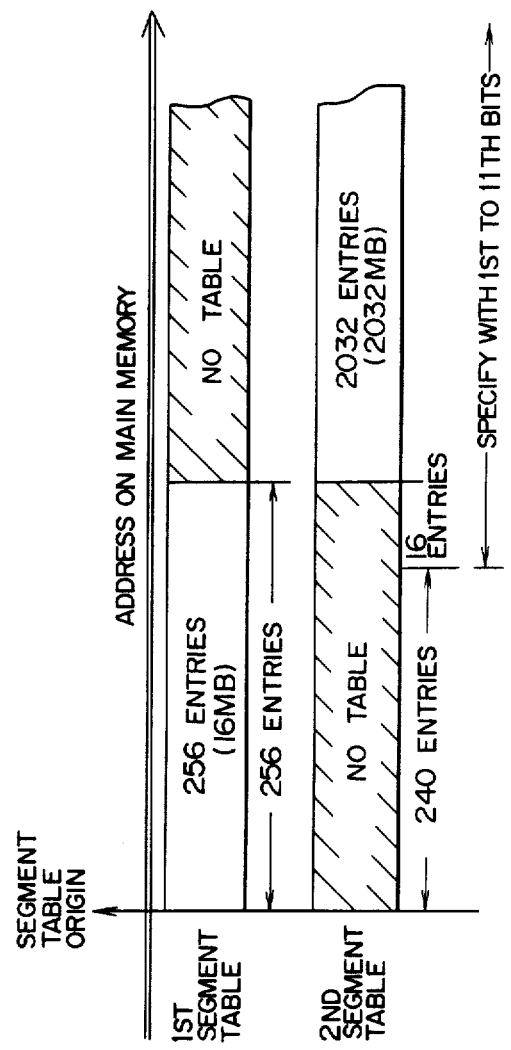
FIG. 3 is a schematic drawing useful for explaining the present invention.

The first and second segment tables 11 and 12 are stored in a main memory. This storage state is shown in FIG. 3. Assuming that main memory addresses are given as shown in FIG. 3, the first segment table 11 occupies the 256 entry area specified by 8 bits starting from the top address (origin) of the segment table. The second segment table 12 is used in a 31 bit mode, and the first to seventh bits in the tables are not all "0" (corresponding to 16 MB or below), i.e., include at least one "1". The address (origin) in the control register 50, the contents of 11 bits from the first to eleventh, and a constant (in this example corresponding to 240 entries) in a register 45 for displacing the storage location so as not to superpose the second segment table upon the first segment table 11 in the main memory, are added together by an adder B 41. The second segment table is accessed based on the obtained address. Such a memory map is as shown in FIG. 3. Particularly, the second segment table is accessed from the location away from the top address of the table by 240 entries, with nothing stored for the first 16 entries. The segments within the area not higher than 16 MB designated by the bits for the first 16 entries have their page table addresses developed within the first segment table.

Selection circuits 43 and 44 are provided in the circuit shown in FIG. 2 for selecting the first and second segment tables 11 and 12. The selection circuits 43 and 44 perform such selection based on whether 7 bits from the bit number 1 to the bit number 7 are all "0". If all "0", the selection circuit 43 selects the adder A 40 and the selection circuit 44 selects an output from the first segment table 11 and the bits from the bit number 16 to the bit number 19. If there is at least one "1" among the 7 bits, the selection circuit 43 selects the adder B 41, and the selection circuit 44 selects an output from the second segment table 12 and the 8 bits from the bit number 12 to the bit number 19. As a result, the upper address up to the bit number 19 designating a page displacement within a segment is given to an adder C 42.

The segment number given by the segment table designates the top address of a page table. Although a single page table 70 is shown in FIG. 2, the number of page tables 70 equals the number of entries in the segment table. In this example, the number of page tables is 2288. With respect to a signal from the first page table whose segment size is 64 kilo bytes, the page displacement for dividing into pages of four kilo bytes is 16. With respect to a signal from the second segment table 12 whose segment size is one mega byte, the page displacement for dividing into pages of four kilo bytes is 256. Real page addresses are stored in page tables.

The operation of address translation using the address translation apparatus as constructed above will now be described. First, the operation in a 24 bit mode will be described. The first to seventh bits are all "0" at this mode. The selection circuit 43 selects the adder A 40 and the selection circuit 44 selects an output from the first segment table 11 and the 16th to 19th bits. The value of the control register 50 and the value from the 8th bit to 15th bit are added together by the adder A 40. Based upon the obtained address, the first segment table 11 is accessed. The top address of a page table read therefrom and the value from the 16th bit to 19th bit are selected by the selection circuit 44 and added together by the adder C 42. The page table is accessed based upon this added value. Thus, a real page address is obtained, which is combined with a displacement field within the page from the 20th bit to 31st bit so that a real address for access to the real memory is obtained in a real address registers 100.

The following operation is performed in a 31 bit mode. When at least one bit among the 1st to 7th bits is "1", the selection circuit 43 selects the adder B 41, and the selection circuit 44 selects an output from the second segment table 12 and the value from the 12th to 19th bits. The value of the control register 50, the value from the 1st bit to 11th bit, and a constant of the register 45 are added together by the adder B 41. Based upon the resulting value, the second segment table 12 is accessed. The value read from the second segment table and the value from the 12th to 19th bits are sent from the selection circuit 44 to be added together by the adder C 42. Based upon the resulting value, the page table 70 is accessed so that similar to the above, a real address is obtained in the real address register 100.

As above, the segment size can be reduced at the area lower than 16 MB, to thereby enable an efficient use of the memory and reduce the number of entries of the segment table. This results in a smaller area of the segment table occupying the main memory, to accordingly improve processing speed.

In the above embodiment, a different segment size is used for the area starting from logical address 0 to a certain address.

Figure 4:
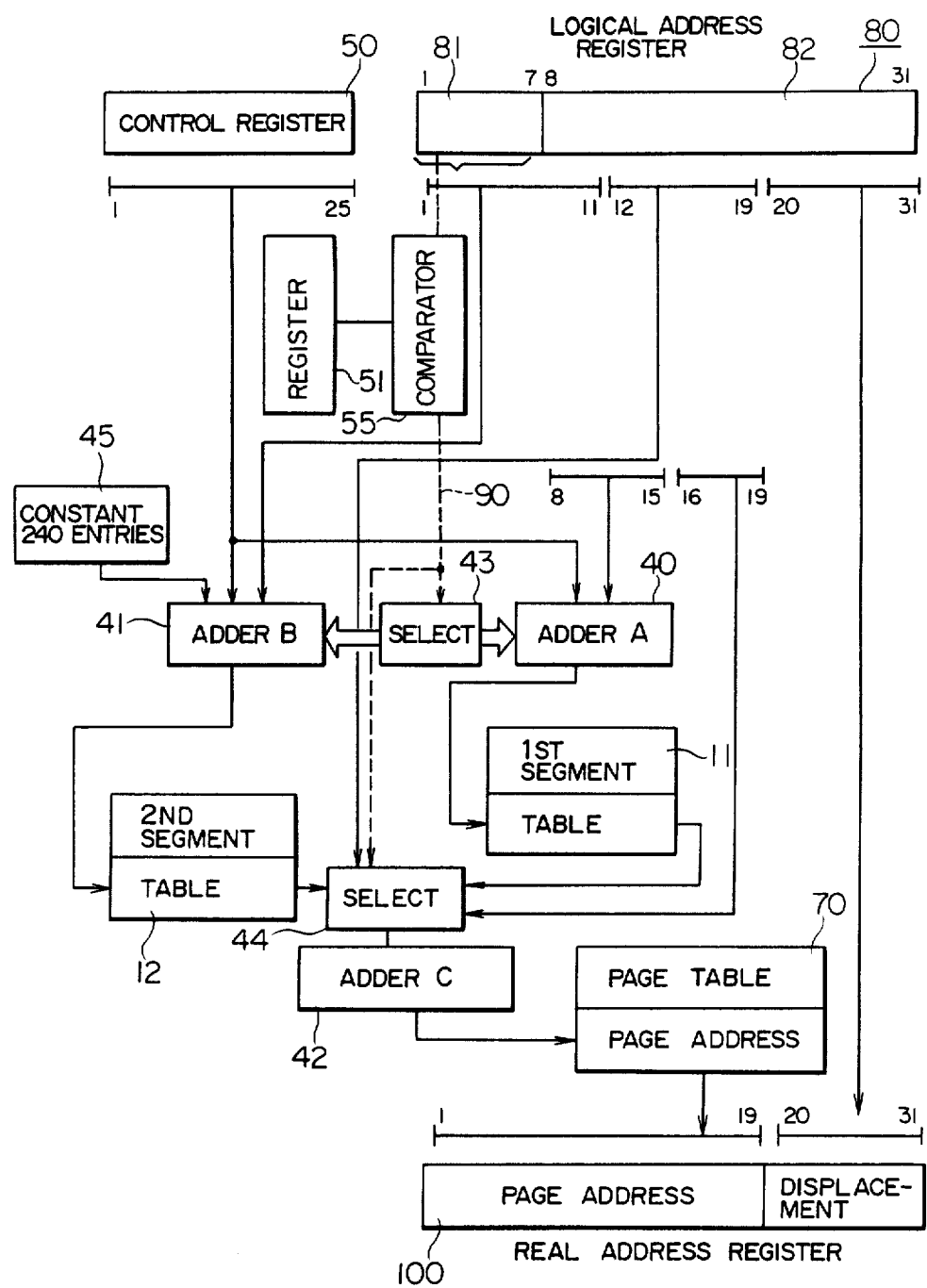
FIGS. 4 and 5 are block diagrams showing address translation apparatus according to other embodiments of the present invention.

FIG. 4 shows another embodiment of an address translation apparatus wherein an arbitrary area in a virtual space can have a different segment size.

The upper address, e.g., the 1st to 7th bits corresponding to more than 16 MB, of a logical address loaded in a logical address register is compared at a comparator 55 with the value of a register 51 set with a desired numeral range. If the logical address is within the first range, the first segment table 11 is selected, and if within the second range, the second segment table 12 is selected. The other circuit portions are similar to the embodiment shown in FIG. 2.

Figure 5:
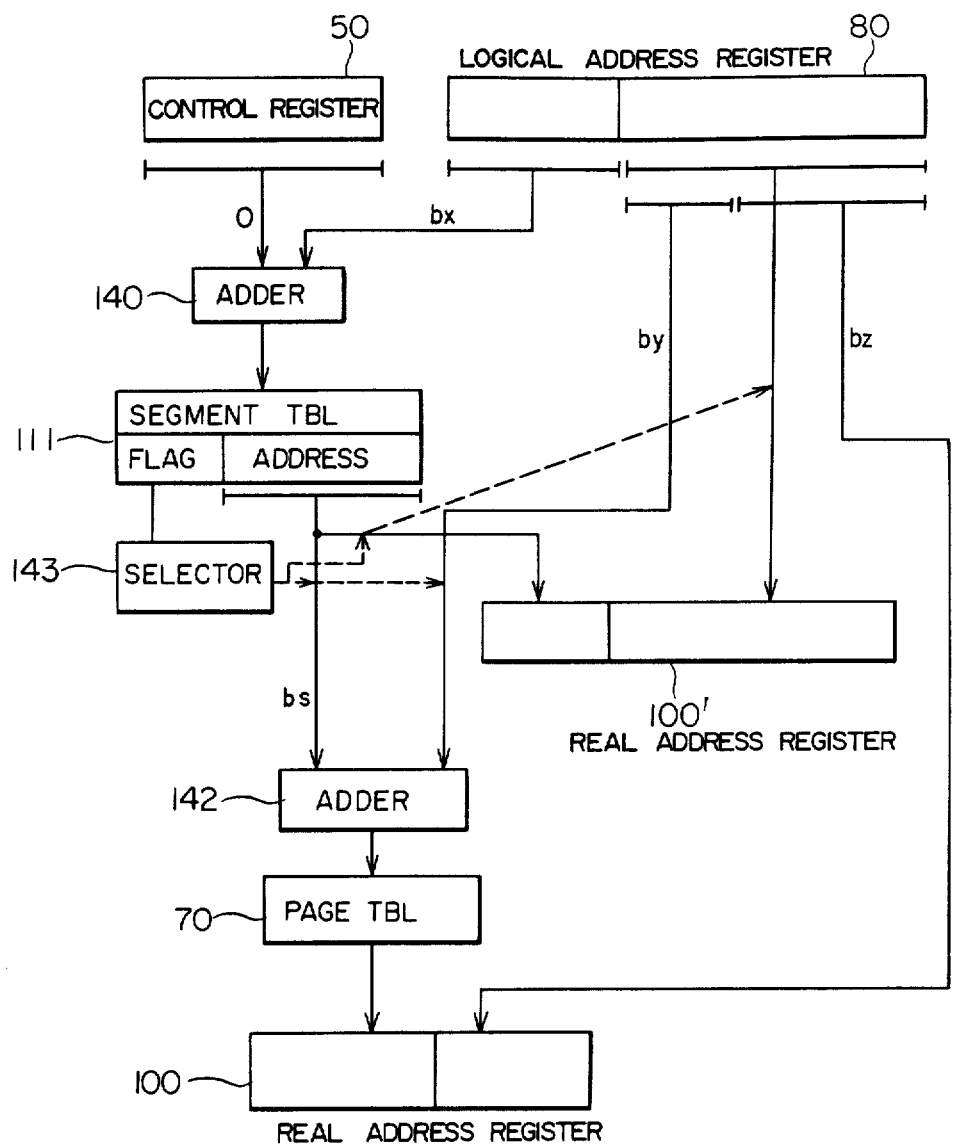

FIG. 5 is a block diagram illustrating an example of changing a page size. A predetermined upper bit $b_x$ of the logical address register 80 and an origin of the control register 50 are added together by an adder 140 and inputted to a segment table 111. The following operations are selected based on whether there is a flag in a flag portion of each bit inputted to the segment table.

If a flag is set, a selection circuit 143 selects an output address $b_s$ from the segment table 111 and the intermediate bits $b_y$ of the logical address register 80 and they are added together by an adder 142. An output of the adder 142 indicates a segment number and a page displacement within the segment. A page table 70 is selected to accordingly determine a page. By combining the page address with the lower bits $b_z$ of the logical address register 80, a real address is obtained in a real address register 100.

We claim:

1. An address translation apparatus for use in a data processing system and capable of address translation in a plurality of address translation modes, said modes distinguished by having two hierarchies of segment page and different segment sizes or by having different page sizes, each mode having an associated block size in a virtual memory space, permitting selection of segment size in the two hierarchies of segment page or of page size by selection of the address translation mode, said apparatus comprising:
   a virtual address register for storing and outputting a virtual address designating an address within a virtual memory space;
   first means responsive to the binary magnitude of the virtual address output from said virtual address register, relative to a preselected set of virtual address ranges, for selecting one of the plurality of address translation modes to be executed; and
   second means responsive to the selected address translation mode for translating the virtual address output from said virtual address register into a real address having a block size dependent upon the selected address translation mode and the binary magnitude of the virtual address.

2. An address translation apparatus according to claim 1, wherein said first means includes means for selecting the address translation mode from a plurality of address translation modes having two hierarchies of segment-page and different segment sizes.

3. An address translation apparatus according to claim 1, wherein said first means includes means for selecting the address translation mode from a plurality of address translation modes having different page sizes.

4. An address translation apparatus according to claim 1, wherein said first means includes means for selecting the address translation mode in accordance with a signal formed from a predetermined number of upper bits in the output from said virtual address register.

5. An address translation apparatus according to claim 1, wherein said first means includes a range setting register for setting a predetermined address range, and a comparator for comparing predetermined upper bits in the output from said virtual address register with the predetermined range.

6. An address translation apparatus according to claim 1, wherein said first means includes a first translation table for performing address translation based upon the predetermined upper bits in said virtual address register and a selection circuit actuated in response to at least part of the output bits from said first translation table.

7. An address translation apparatus according to claim 1, wherein said first means includes a dedicated table for selecting the translation mode based upon at least part of the virtual address.

8. An address translation apparatus according to claim 5, wherein said first means includes means for selecting the address translation mode from a plurality of address translation modes having two hierarchies of segment-page and different segment sizes.

9. An address translation apparatus according to claim 7, wherein said first means includes means for selecting the address translation mode from a plurality of address translation modes having different segment sizes.

10. An address translation apparatus according to claim 6, wherein said first means includes means for selecting the address translation mode from a plurality of address translation modes having two hierarchies of segment-page and different segment sizes.

11. An address translation apparatus according to claim 8, wherein said first means includes means for selecting the address translation mode from a plurality of address translation modes having two hierarchies of segment-page and different segment sizes.

12. An address translation method performed on a digital computer and capable of address translation in a plurality of address translation modes, said modes distinguished by having two hierarchies of segment page and different segment sizes or by having two different page sizes, each mode having an associated block size in a virtual memory space, permitting selection of segment size in the two hierarchies of segment page or of page size by selection of the address translation mode, said method comprising the steps of:

storing a virtual address in a virtual address register, the virtual address designating an address within a virtual memory space;

selecting, on the basis of the binary magnitude of the stored virtual address relative to a preselected set of virtual address ranges, one of the plurality of address translation modes to be executed; and translating the stored virtual address into a real address having a block size dependent upon the selected address translation mode and the binary magnitude of the virtual address.

13. An address translation method according to claim 12, wherein the selecting step includes selecting the address translation mode from a plurality of address translation modes having two hierarchies of segment-page and different segment sizes.

14. An address translation method according to claim 12, wherein the selecting step includes selecting the address translation mode from a plurality of address translation modes having different page sizes.

15. An address translation apparatus according to claim 1, wherein said second means comprises:

means defining a plurality of address translation tables for each of said plurality of address translation modes, for translating the stored virtual address into a real address; and means responsive to the selected address translation mode for supplying to one of the plurality of address translation tables for the selected translation mode output bits from said virtual address register, the number of output bits depending upon the selected translation modes.

16. An address translation apparatus according to claim 1, wherein said second means comprises:

means defining a first address translation table having a plurality of entries, each entry holding a real address;

means defining a plurality of second address translation tables, each of said second address translation tables corresponding to a respective one of the plurality of address translation modres and having a plurality of entries, each entry holding an entry address of said first address translation table, said second address translation tables outputting the entry address of the first address translation table held in the entry of the second address translation table indicated by the virtual address output from said virtual address register;

said first address translation table outputting a real address from the entry indicated by the entry address output fromm said second address translation tables; and means responsive to the selected address translation mode for supplying to the one of said second address translation tables corresponding to the selected translation mode a first portion of the output from said virtual address register, the magnitude of at least a part of said first portion being dependent upon the selected translation mode.

17. An address translation apparatus according to claim 16, wherein said second means further comprises:

means responsive to the selected address translation mode for combining the output of the corresponding one of said plurality of second address translation tables and a second portion of the output of the virtual address register, different from said first portion and for supplying the combined result to said first address translation table as an entry address.

18. An address translation apparatus according to claim 15, wherein said first means includes means for selecting the address translation mode in accordance with a signal formed from a predetermined number of upper bits in the output from said virtual address register.

19. An address translation apparatus according to claim 15, wherein said first means includes a range setting register for setting a predetermined address range, and a comparator for comparing predetermined upper bits in the output from said virtual address register with the predetermined range.

* * * * *